(12) United States Patent
Lemchen

(10) Patent No.: US 6,594,642 B1
(45) Date of Patent: Jul. 15, 2003

(54) AUTOMATED CUSTOMIZED REMOTE ORDERING AND MANUFACTURING PROCESS

(76) Inventor: Marc S. Lemchen, 553 Park Ave., New York, NY (US) 10021

(*) Notice: Subject to any disclaimer, the term of this patent is extended or adjusted under 35 U.S.C. 154(b) by 0 days.

(21) Appl. No.: 09/512,933

(22) Filed: Feb. 25, 2000

(51) Int. Cl.[7] ............................................. G06F 17/60
(52) U.S. Cl. ......................................... 705/26; 705/27
(58) Field of Search ............................. 705/26, 14, 27

(56) References Cited

U.S. PATENT DOCUMENTS

| | | | |
|---|---|---|---|
| 5,991,528 A | * 11/1999 | Taylor et al. | |
| 6,154,738 A | * 11/2000 | Call | 705/26 |
| 6,167,383 A | * 12/2000 | Henson | 705/26 |
| 6,219,586 B1 | * 4/2001 | Sakai | 700/182 |
| 6,282,518 B1 | * 8/2001 | Farrell et al. | 705/26 |
| 2001/0014868 A1 | * 8/2001 | Herz et al. | 705/14 |

FOREIGN PATENT DOCUMENTS

WO        WO 01/37756        * 5/2001

OTHER PUBLICATIONS

Glenn Rifkin, "Levi jeans go on-line in US" Nov. 1994, The Guardian, p. 24.*

Comerford et al. "The flexible factory:case studies" Sep. 1993, IEEE Spectrum, v30n9, pp. 28-42.*

Elson Joel, "Computers seen transforming supermarket of the future" Apr. 1984, Supermarket News, v34, pS14.*

* cited by examiner

*Primary Examiner*—Robert P. Olszewski
*Assistant Examiner*—Lynda Jasmin
(74) *Attorney, Agent, or Firm*—Daniel L. Dawes; Myers Dawes Andras & Sherman LLP

(57) ABSTRACT

An automated process and a system for ordering and manufacturing personalized products over the Internet are provided. This process may apply to a limitless variety of products which are desirable to personalize. A robotic manufacturing machine offers options on multiples physical features of a product. These options are presented to consumers via the Internet. A consumer selects the options using a computer. The selected options are received by a web server and converted to machine instructions. The machine instructions are transmitted to the robotic machine which produces a product according to the instructions received. The end result is a personalized product manufactured specifically to the consumer's selections as a result of a completely automated process.

31 Claims, 1 Drawing Sheet

AUTOMATED CUSTOMIZED REMOTE ORDERING AND MANUFACTURING PROCESS

BACKGROUND OF THE INVENTION

1. Field of the Invention

The invention relates generally to processes for ordering and manufacturing products over the Internet.

2. Description of Related Art

The advent of the Internet has enabled merchants and consumers to engage in commerce with unprecedented efficiency. Customers can order products without ever having to physically step inside a store. Merchants can sell their goods without having to construct a building or maintain an inventory. Using the Internet, communications and commerce have been advanced to the point where information and transactions can be conducted almost instantaneously.

Despite these technological advancements, consumers are hard pressed to order products over the Internet which are customized according to their preferences. Therefore, what is needed is a process which enables consumers to order customized products over the Internet.

SUMMARY OF THE INVENTION

In one aspect, a method is disclosed for ordering and manufacturing goods over the Internet. The method comprises: providing a plurality of options corresponding to a physical feature of a product; selecting at least one of the options using a computer; electronically converting a selected option into machine instruction; transmitting the machine instruction to a robotic machine; and producing the product according to the machine instruction with the robotic machine. The instructions may be forwarded directly to the robotic machine, or to a lesser automated production area using traditional manufacturing techniques.

The step of providing a plurality of options corresponding to a physical feature comprises the step of conforming the options to manufacturing capabilities of the robotic machine. Therefore, options are provided to the consumer to the extent that the robotic machine is capable of performing those options. The step of selecting at least one of the options using a computer comprises the step of viewing the options by way of a web-site on the Internet.

The method further comprises the step of transmitting the selected option from the computer to a server via the Internet. The step of electronically converting a selected option into machine instruction comprises the step of electronically converting the selected option into machine instruction with the server. The step of transmitting the machine instruction to a robotic machine comprises the step of transmitting the machine instruction from the server to the robotic machine. Although the foregoing method has been described in terms of steps for grammatical purposes, it is to be expressly understood that the claims are not to be read as limited by "means" or "steps" restrictions in 35 USC 112.

In another aspect, a system is disclosed for ordering and manufacturing personalized products over the Internet. The system comprises a web server to receive selected options corresponding to physical features of a product from consumers via the Internet, a converter to convert the selected options to machine instructions, and a robotic machine to process the machine instructions and to manufacture the product according to the machine instructions.

The web server presents manufacturing options to the consumers via the Internet. The options correspond to capabilities of the robotic machine in manufacturing the product. The web server may comprise a converter such that a computer receives selected options from consumers and converts the information into executable machine instructions.

The invention, now having been briefly summarized, may be better visualized by turning to the following drawings wherein like elements are referenced by like numerals.

Figure 1:
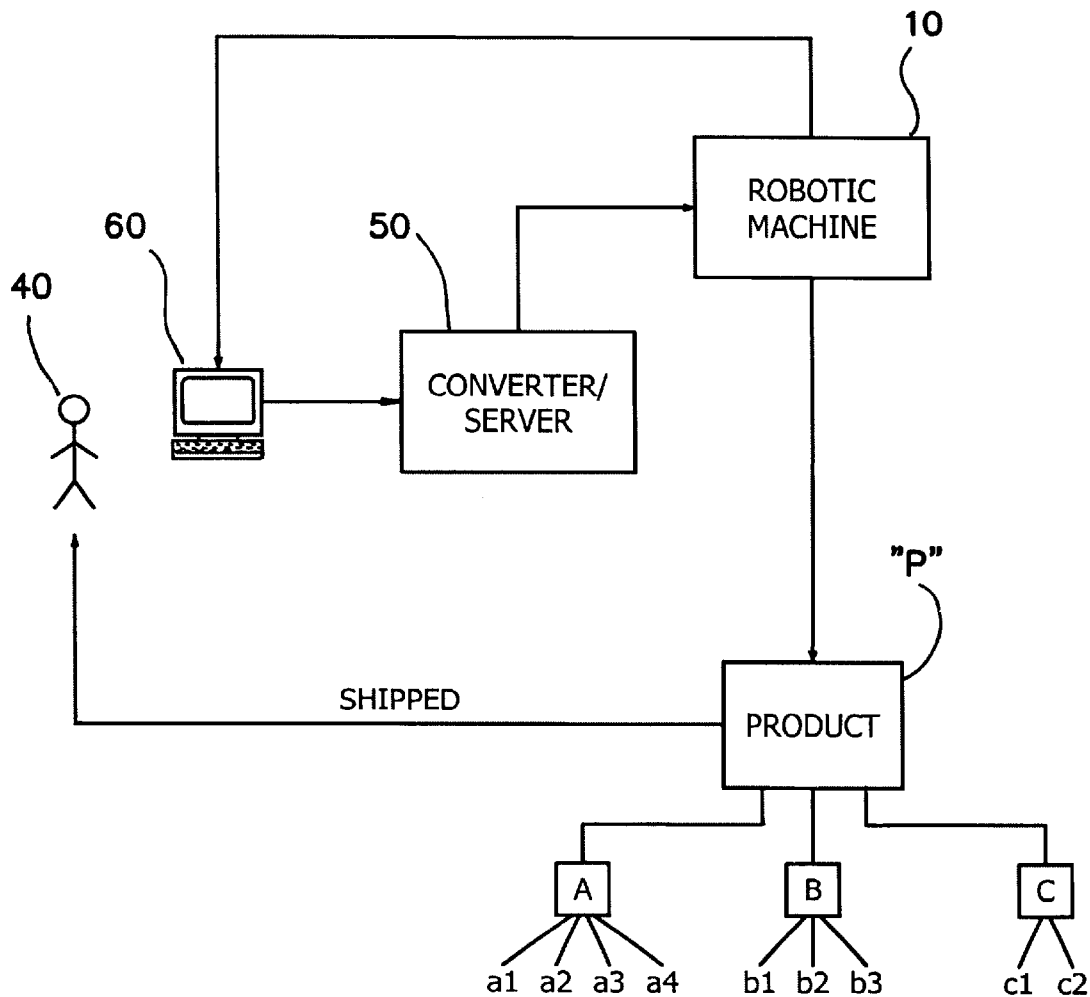
FIG. 1 is a diagram illustrating a preferred embodiment of the process and system.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS

An automated process and a system for ordering and manufacturing personalized products over the Internet are provided. This process may apply to a limitless variety of products which can be personalized to the customer. A robotic manufacturing machine or system offers options through a web server on multiple physical features of a product. These physical product options are presented to the consumer via the Internet. A consumer or a service professional, such as a dentist, doctor, nutritionist, beautician or the like, selects the options in behalf of the patient or customer using remote a computer at the point of sale. The selected options are received by a remote web server and directly or indirectly converted to executable machine instructions along with transactional information necessary to bill the credit card account of the patient or consumer and to provide the ordering merchant with a predetermined commission.

The machine instructions are directly or indirectly transmitted to the robotic machine or manufacturing system which produces the product according to the instructions received. The end result is a personalized product manufactured specifically to the consumer's selections or prescribed selections as a result of a substantially or completely automated process. While complete automation from ordering to billing to manufacturing is preferred, the invention contemplates that the ideal may be approximated by allowing portions of the process not to be automated as well.

In FIG. 1, a product "P" to be manufactured by a robotic machine 10 is characterized by a plurality of physical features, "A", "B" and "C". It is to be expressly understood that the product features comprise physical aspects of the product which are optionable or which present more than one choice. The features include physical components and physical characteristics of a product, such as different structural elements or different compositions of matter. Depending upon its capabilities, machine 10 may offer several options for one or more of the physical features of the product "P".

In FIG. 1, a robotic machine 10 to manufacture the product "P" offers options a1–a4 for a first component "A", b1–b3 for a second component "B", and c1–c2 for a third component C. This may correspond, for instance, to a robotic machine to manufacture toothbrushes which offers choices on: the length, rigidity, density, and configuration (options) of the bristles (feature); the length, color and shape (options) of the handle (feature); and whether or not (option) a pick (feature) is included. It is to be expressly understood that any number of physical features may be provided for a particular product "P", and that any number of options may be provided for each feature.

More specifically, a physical feature may be an extra item to be added to the product, and the options corresponding to that physical feature may be whether or not to have such an item. Similarly, color may be a physical feature. Thus, physical features include chemical composition, appearance and structure. For example, if a shampoo is being formulated, any one of a multiplicity of active or inactive ingredients may be included or not according to consumer choice, such as whether the shampoo is for oily or dry hair, includes a straightener or not, includes a tinting agent or not, has a particular scent or not, includes dandruff medication or not and so on across the full range of options for hair products. A type of packaging for the product may also be selected. For instance, the shampoo may be packaged in a glass bottle, plastic bottle, recyclable container, decorative bottle, or any other type of bottle. Similarly, soap can be ordered in a formulation to meet the dermatological requirements of a patient or customer as well as that customer's personal preferences regarding essentially nonfunctional aspects of the product or its packaging or form of delivery to the skin. Still further, a customized tooth brush can be ordered and custom made on a one-unit basis specifying shape of the handle, shape and area of the brush head, type and number of bristles, stiffness or softness of bristles, choice of bristle material, distribution of bristles and bristle lengths in the toothbrush head, color of handle and bristles, and so on including every possible patient need or preference. Stationery products of all kinds, school supplies, such as binders, could also be customized not only by choices among all the various features that could be imagined for a school binder, but also to include aesthetic features such as choice of cover illustrations and customized printing on the binder covers. Clothing and wearing apparel can be custom manufactured by the invention where not only fashion choices for clothing, jewelry, shoes, gloves, hats and the like can be dictated by the consumer, but that sizes can be customized so that mass manufactured clothing and wearing apparel is manufactured on an individually tailored basis. Clothes for nonaverage sized or proportioned people will finally fit and look good on them. The examples could be proliferated nearly endlessly for different products and their different characteristics.

Robotic machine 10 is a conventional robotic assembler and contemplates any wholly or partially robotic assembly line or system now known or later devised. Robotic machine 10 comprises a robotic assembly line well known to the art, such as the one described by Best, "*Method For Processing And Assembly Of Small Parts Utilizing A Robot,*" U.S. Pat. No. 5,636,425 (Jun. 10, 1997) incorporated herein by reference. Numerous other patent examples can be found in U.S. Patent search classes 29/407.04; 29/407.09; and 29/430, all of which are incorporated herein by reference. The invention is not to be limited by nor is it particularly affected by the specific implementation chosen for any given robotic assembly line. The robotic machine 10 operates in response to digital machine instructions which are provided directly or indirectly from the web server.

The physical components and options associated therewith may be determined by a manufacturer. Therefore, the manufacturer may elect to supply whatever options it believes to be most desirable to the greatest number of consumers. These options correspond to physical features of the product. Once determined, robotic machine 10 is programmed to provide the elected options. The set of manufacturing options a1–4, b1–b3, and c1–c2, which are predetermined according to the abilities and choices offered by the robotic machine 10, are provided to consumer 40 over the Internet. Consumer 40 views the available options from a computer 60. Consumer 40 or his attending merchant or service professional selects in his behalf from the options a1–4, b1–b3, and c1–c2 corresponding to each component A, B, C of the product P.

The consumer's selections are directly or ultimately digitally translated to machine instructions, as illustrated diagrammatically by the converter 50, and then transmitted directly to the robotic machine 10. In the preferred embodiment, the converter 50 comprises a computer web server 50. Web server 50 automates the manufacturing process by automatically updating a database with the consumer order. This database has a manufacturing queue that will route the orders to the robotic machines with the appropriate machine codes, for that order, as illustrated by converter 50. Web server 50 is preferably located physically at the manufacturing facilities where the robotic machine 10 is located. Web server 50 receives all purchase selections from consumers worldwide and then translates each selection into a set of machine instructions. The machine instruction is then transmitted directly to robotic machine or assembly line 10.

It is to be expressly understood that the machine instructions comprise any type of electronic information which may be read by a robotic machine. Robotic machine 10 receives the machine instructions and produces the product "P" according to the consumer's specifications. Therefore, the entire process from consumer 40 to robotic machine 10 is preferably automated and computer-controlled. Once manufactured, the product "P" may then be drop shipped to the consumer directly from the manufacturing facility.

It will be appreciated that since the entire process from the consumer's computer 60 to robotic machine 10 can be automated, the process may not involve any human involvement therebetween. This process practically enables manufacturers to mass produce goods while simultaneously personalizing each individual product.

Consumers will be able to personalize goods that once could not be economically personalized. With this process, the consumer can personalize a multitude of products over the Internet. The process may be expanded to a variety of other products in the same general field, such that a consumer can at a single web-site design an entire kit or combination of related personalized products. Since the consumer's choices are converted into machine instructions, which are then transmitted directly to the robotic assembly line, the greater efficiency yielded by this process lead to lower costs for the manufacturer and lower prices for the consumer.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

What is claimed is:

1. A method for automatically manufacturing goods in accordance with a non-expert consumer's order for said goods placed over the Internet comprising:

providing a plurality of options over the Internet corresponding to at least one physical feature of a product;

electronically receiving said order selecting at least one of said options over the Internet;

electronically converting a selected option into at least one machine instruction in an Internet server;

transmitting said machine instruction to a robotic machine remote from said non-expert consumer; and automatically producing said product with said selected option according to said at least one machine instruction with said robotic machine;

wherein providing a plurality of options over the Internet corresponding to at least one physical feature of a product comprises providing a plurality of options for a chemical composition, an appearance, or a structure of said product.

2. The method in claim 1 wherein providing a plurality of options corresponding to a physical feature comprises conforming said options to manufacturing capabilities of said robotic machine.

3. The method in claim 1 wherein said selecting at least one of said options using a computer comprises viewing said options communicated to said computer via the Internet.

4. The method in claim 1 further comprising transmitting said selected option from said computer to a web server via the Internet.

5. The method in claim 4 wherein said electronically converting a selected option into at least one machine instruction comprises electronically converting said selected option into at least one machine instruction at said web server.

6. The method in claim 5 wherein said transmitting said machine instruction to a robotic machine comprises transmitting said machine instruction from said web server to said robotic machine.

7. The method of claim 1 where providing a plurality of options over the Internet corresponding to at least one physical feature of a product comprises providing a plurality of options for personal hygiene products.

8. The method of claim 7 where providing a plurality of options for personal hygiene products comprises providing a plurality of options for oral hygiene products.

9. The method of claim 7 where providing a plurality of options for personal hygiene products comprises providing a plurality of options for hair care products.

10. The method of claim 7 where providing a plurality of options for personal hygiene products comprises providing a plurality of options for skin care products.

11. The method of claim 1 where providing a plurality of options over the Internet corresponding to at least one physical feature of a product comprises providing a plurality of options for clothing and apparel products.

12. The method of claim 1 where providing a plurality of options over the Internet corresponding to at least one physical feature of a product comprises providing a plurality of options for stationery products.

13. The method of claim 1, wherein:

said product is a toothbrush, and said step of providing further comprises providing a plurality of options for said toothbrush, said options including a plurality structures for selective, automatic manufacture of said toothbrush in accordance with at least one of said structures.

14. The method of claim 1, wherein providing a plurality of options comprises providing options for said chemical composition having at least one chemical and a range of quantities for each chemical of said chemical composition.

15. The method of claim 1, wherein providing a plurality of options comprise providing a plurality of packaging options for said product.

16. The method of claim 1, wherein the product comprises stationery and the options include a plurality of stationary products and a plurality customized illustrations with which the stationery may be selectively and automatically manufactured.

17. The method of claim 1 wherein said product is at least one article of apparel and providing a plurality of options over the Internet comprises a plurality of styles and a plurality of sizes of said article available for selective, automatic manufacture.

18. An automatic manufacturing system operating automatically in response to a non-expert consumer's order from a remote computer and received electronically over the Internet comprising:

a web server to send to said remote computer options corresponding to physical features of a product and to receive from said non-expert consumers via the Internet selected options from said remote computer;

a converter associated with said web server and configured to automatically convert said selected options to at least one machine instruction; and a robotic machine electronically connected to said converter and configured to automatically process said machine instructions and to manufacture said product according to said machine instructions;

wherein said web server automatically forwards said at least one machine instruction to a robotic machine and automatically manufactures said product in accordance with said consumer's order; and wherein said web server sends and receives selected options from said remote computer over the Internet corresponding to at least one product feature of at least one of a chemical composition an appearance, or a structure of said product.

19. The system of claim 18 wherein said web server presents options to said consumers via the Internet, said options corresponding to capabilities of said robotic machine in manufacturing said product.

20. The system of claim 18 wherein said web server comprises said converter.

21. The apparatus of claim 18 where said web server sends and receives selected options from said remote computer over the Internet corresponding to at least one product feature of a personal hygiene product.

22. The apparatus of claim 21 where said web server sends and receives selected options from said remote computer over the Internet corresponding to at least one physical feature of a oral hygiene product.

23. The apparatus of claim 21 where said web server sends and receives selected options from said remote computer over the Internet corresponding to at least one physical feature of a hair care product.

24. The apparatus of claim 21 where said web server sends and receives selected options from said remote computer over the Internet corresponding to at least one physical feature of a skin care product.

25. The apparatus of claim 18 where said web server sends and receives selected options from said remote computer over the Internet corresponding to at least one physical feature of clothing and apparel products.

26. The apparatus of claim 18 where said web server sends and receives selected options from said remote computer over the Internet corresponding to at least one physical feature of stationery products.

27. The apparatus of claim 18 wherein:

said product is a toothbrush, and said web server sends and receives said selected options comprising a plurality structures for selective automatic manufacture of said toothbrush in accordance with at least one of said structures.

28. The apparatus of claim 18 wherein said product comprises a chemical composition, said web server sends and receives selected options from said remote computer over the Internet corresponding to options for said chemical composition having at least one chemical and a range of quantities for each chemical of said chemical composition.

29. The apparatus of claim 18 wherein said web server sends and receives selected options from said remote computer over the Internet corresponding to a plurality of packaging options for said product.

30. The apparatus of claim 18 wherein said product is stationery, said web server sends and receives selected options from said remote computer over the Internet corresponding to a plurality of stationary products and a plurality customized illustrations with which the stationery may be selectively and automatically manufactured.

31. The apparatus of claim 18 wherein said product is at least one article of apparel, and wherein said web server sends and receives selected options from said remote computer over the Internet corresponding to a plurality of styles and a plurality of sizes of said article of apparel available for selective and automatic manufacture of said article of apparel.

\* \* \* \* \*